J. MULCAHY.
HOLDER FOR SPARE DEMOUNTABLE RIM OR RIMS.
APPLICATION FILED APR. 3, 1917.
1,320,084.
Patented Oct. 28, 1919.
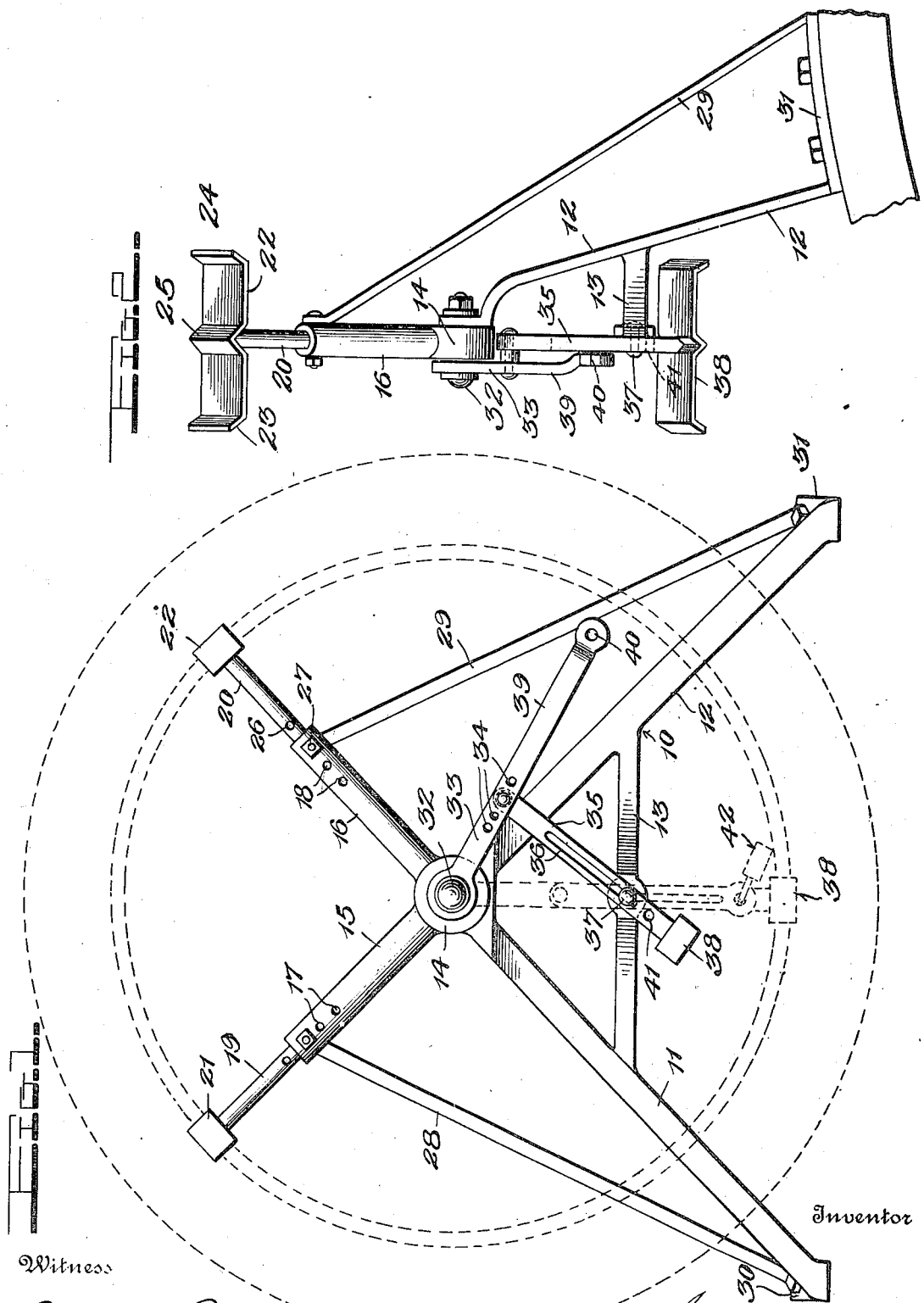

J. MULCAHY.
HOLDER FOR SPARE DEMOUNTABLE RIM OR RIMS.
APPLICATION FILED APR. 3, 1917.
1,320,084.
Patented Oct. 28, 1919.
2 SHEETS—SHEET 2.
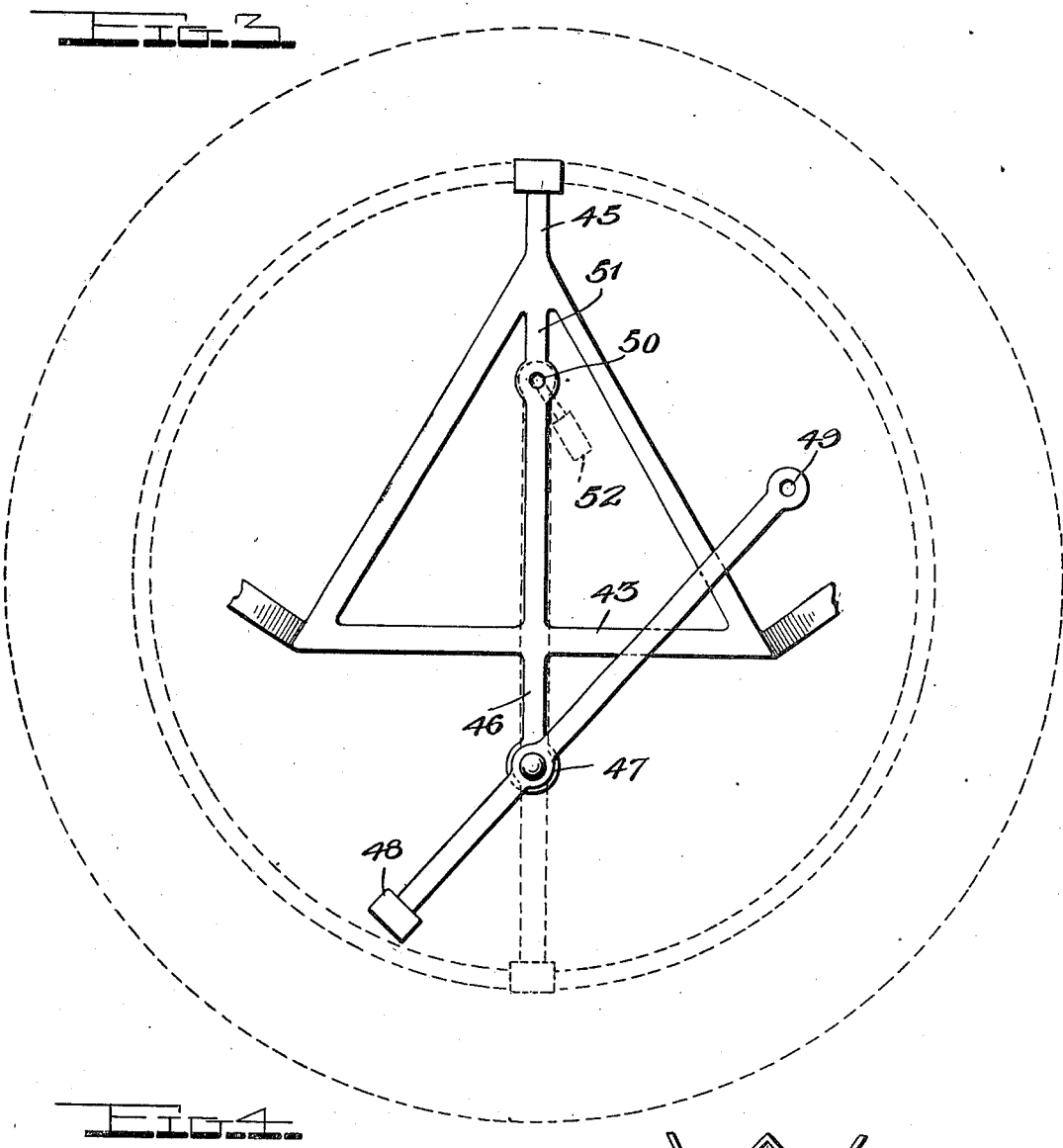
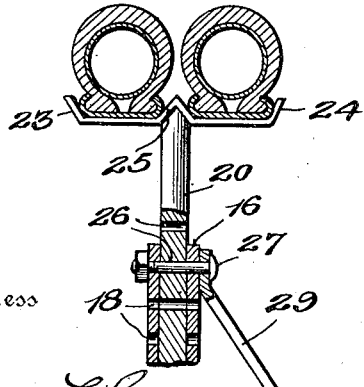
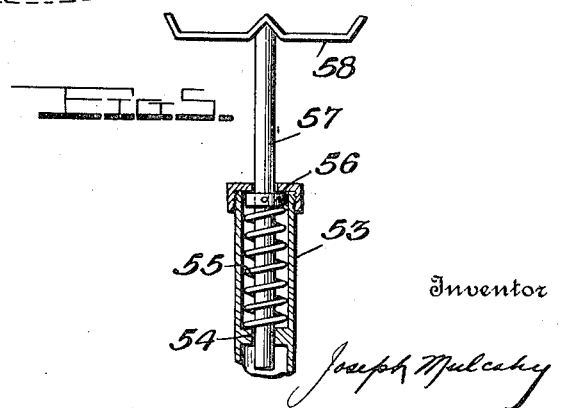
Inventor
Joseph Mulcahy
Witness
Chas. L. Grissbauer.
By
Attorneys

UNITED STATES PATENT OFFICE.

JOSEPH MULCAHY, OF ASTORIA, NEW YORK, ASSIGNOR OF ONE-FOURTH TO EARLEY B. McCULLEN, OF NEW YORK, N. Y.

HOLDER FOR SPARE DEMOUNTABLE RIM OR RIMS.

1,320,084.        Specification of Letters Patent.        Patented Oct. 28, 1919.

Application filed April 3, 1917. Serial No. 159,458.

*To all whom it may concern:*

Be it known that I, JOSEPH MULCAHY, a citizen of the United States, residing at Astoria, county of Queens, in the State of New York, have invented certain new and useful Improvements in Holders for Spare Demountable Rim or Rims.

This invention relates to tire-carriers particularly adapted to support a spare tire or tires on a motor vehicle.

One of the objects of the invention is to provide means whereby the tire will be rigidly supported by the carrier in such a manner that it may readily be detached when desired.

Another object of the invention is to provide means whereby a plurality of tires may be supported in such manner that one of them may be removed without disturbing the other.

It is also the object of this invention to provide means whereby tires of different diameters may be accommodated.

Other objects and advantages of this invention will be specifically referred to hereinafter, it being understood that changes in form, proportion and minor details of construction may be resorted to without departure from the spirit of the invention or sacrificing any of its advantages.

In the drawings:

Figure 1 is a side elevational view of a tire carrier constructed in accordance with my invention, the clamping jaw being shown in position in dotted lines.

Fig. 2 is an end view of the carrier.

Fig. 3 is a side view of a slightly modified form of carrier.

Fig. 4 is an enlarged sectional view through one of the rigid jaw connections, and Fig. 5 is an enlarged view of a slightly modified form of tire engaging jaw.

Referring now to the drawings by numerals of reference and particularly to Figs. 1 and 2, 10 designates the supporting base or standard consisting of the two downwardly diverging legs 11 and 12 connected by cross bar 13 whereby the base or frame 10 is shown as being in form of a letter A. At the upper meeting ends of the two legs 11 and 12 is a head 14 with upwardly diverging tubular jaw supports 15 and 16 provided with openings 17 and 18. The tubes 15 and 16 receive the shanks 19 and 20 of the rigid jaws 21 and 22. The form of jaw is shown in Figs. 2 and 4 as consisting of a head with upwardly disposed edge flanges 23 and 24. 25 is intersecting partition whereby two tires may be clamped by a single jaw. By reference to Fig. 1 it will be observed that the shanks are provided with openings 26 corresponding to the openings in the tubes 15 and 16, and that the shanks may be longitudinally adjustable within the tubular supports being held rigid therewith by the fastening device 27 which are also connected to the stay braces 28 and 29, carried by the base plates 30 and 31. If desired, a frame consisting of the legs 11 and 12, the cross bar 13 and braces 28 and 29 and base plates 30 and 31 may all be formed of a single piece.

The head 14 is adapted to be secured to the frame 10 by fastening devices consisting of a bolt 32 which passes through an opening in the apex of the frame 10, and through an opening in the head 14. The bolt 32 serves as a shaft for the pivoted lever 33 having intermediate its ends openings 34, whereby the end of the lever 35 may be adjustably secured thereto. The lever 35 is provided with an elongated slot 36 engaged by the headed pin 37 on the bar 13 under the free end of the lever 35, and carries a jaw 38 corresponding to one of the jaws 21 or 22. The levers 33 and 35 constitute toggle levers, the projecting end 39 of the lever 33 being provided with an opening 40 which is adapted when the toggles are in a position shown in Fig. 1 to coincide with the openings 41 in order that when the jaw 38 is in the position shown in dotted lines on Fig. 1 the hasp of the lock 42 may be passed therethrough to lock the wheels to the carrier. When it is desired to remove the wheel or wheels, the hasp is released from the engagement with the openings 40 and 41, and the toggles are swung into a position approximating that shown in full lines in Fig. 1 whereupon the tire may be removed.

In Fig. 3 I have shown a slightly modified form of frame consisting of a triangular structure 43, having a single rigid jaw 45 nonadjustable thereon, and with a projecting portion 46 to which is pivoted a lever 47 on one end of which is a jaw 48, and at the other end of which is an opening 49 adapted to aline with the opening 50 in the central part 51 of the triangular frame when the jaw 48 is in clamping engagement with the tire as shown in dotted lines in Fig. 3. When the lever 46 is moved to locking position the hasp of the lock 52 may be passed through openings 49 and 50 to lock the tire on the carrier. In Fig. 5 the tubular support 53 is provided with an abutment 54 against which one end of the spring 55 is received the other end of the spring being received against the collar 56 on the shank 57 of the jaw 58 whereby the tendency of the spring is to press the jaw 58 into clamping position.

In the modification shown in Fig. 3 it will be obvious that the tire may be readily applied or removed from the carrier by manipulating the lever 47.

I claim:—

1. In a device of the class described, a stand, comprising an A-shaped frame, upwardly diverging arms carried by said frame and provided with fixed tire engaging jaws, a lever pivoted at the apex of the frame and having swinging movement in a plane parallel to the plane of said frame, and a slotted lever on said frame having a tire engaging jaw at one end and adjustably connected to the intermediate portion of the pivoted lever at its other end.

2. In a device of the class described, a frame having downwardly diverging legs and upwardly diverging tire engaging jaw supports, a lever pivoted to said frame and having swinging movement in a plane parallel to the plane of the frame, a pivoted and longitudinally movable lever on said frame having a tire engaging jaw at one end and means for adjustably connecting the other end of said jaw carrying lever with the intermediate portion of the first named lever.

The foregoing specification signed at Astoria, New York, this thirteenth day of March, 1917.

JOSEPH MULCAHY.

In presence of two witnesses:
JOHN H. TIEDEMANN,
JOHN J. MONKS.